Jan. 15, 1963  W. H. EBURN, JR  3,073,228
PHOTOGRAPHIC PRODUCT

Filed May 7, 1959  3 Sheets-Sheet 1

INVENTOR.
William H. Eburn, Jr.
BY
ATTORNEYS

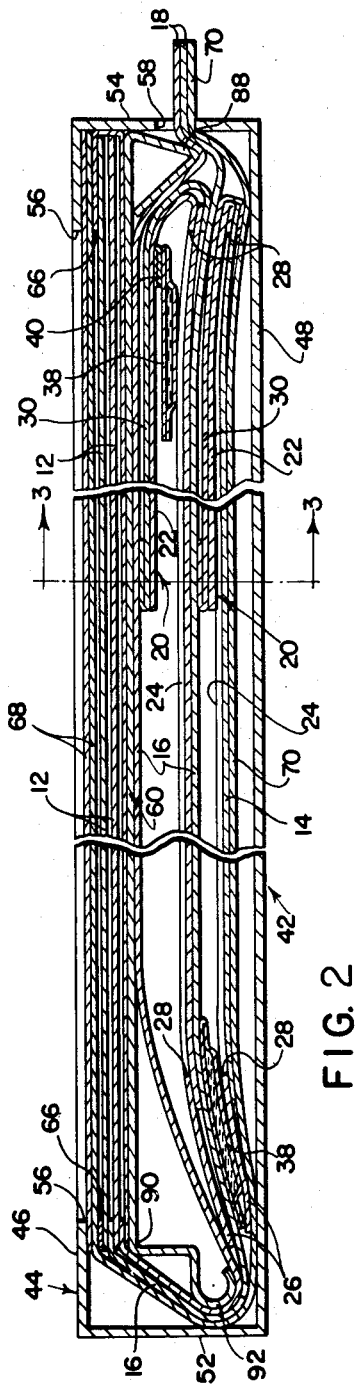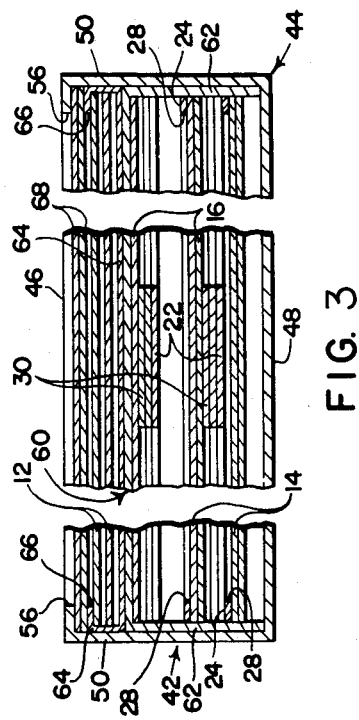

United States Patent Office 3,073,228
Patented Jan. 15, 1963

3,073,228
PHOTOGRAPHIC PRODUCT
William H. Eburn, Jr., East Weymouth, Mass., assignor to Polaroid Corporation, Cambridge, Mass., a corporation of Delaware
Filed May 7, 1959, Ser. No. 811,685
5 Claims. (Cl. 95—19)

This invention relates to photographic products and more particularly to improvements in photographic film assemblages of the type including sheet materials which are moved within the assemblage.

The present invention is concerned with improvements in film assemblages or packs of the type including a container and a plurality of photosensitive elements adapted to be exposed in sequence within the container. An object of the invention is to provide, in a photographic film assemblage comprising means for supporting a plurality of photosensitive elements in position for exposure, improved means for facilitating the movement of one of said photosensitive elements from exposure position on one side of the supporting means to the opposite side thereof while restraining any other photosensitive element against movement.

Other objects of the invention are: to provide a photographic film assemblage of the foregoing type wherein each of the photosensitive elements is coupled with a leader sheet, the leader sheets are arranged in stacked relation and extend around an end portion of the supporting means, and the means for restraining the photosensitive elements against movement comprises the end portion of the support means around which the photosensitive elements are drawn; and to provide a photographic film assemblage as described wherein said end portion of said supporting means includes an abrupt edge and a dependent section for guiding the photosensitive elements around the abrupt edge, and each of the photosensitive elements is arranged with an edge aligned with the abrupt edge of the support means.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a somewhat diagrammatic, fragmentary, sectional view taken substantially midway between the sides of the film pack of FIG. 1;

FIG. 3 is a sectional view taken along the line 3—3 of FIG. 2;

The present invention is generally applicable to photographic products in the form of a film assemblage, or pack, of the type including a plurality of photosensitive sheets arranged for exposure in stacked relation on a support element and adapted to be exposed in sequence, and following exposure, to be withdrawn from the stack to permit exposure of the next successive photosensitive sheet. The film packs of this type usually include a container having an exposure aperture in one side, a withdrawal aperture at one end, and a support element or pressure plate underlying the exposure aperture for supporting photosensitive sheets in alignment with the exposure aperture. Each photosensitive sheet is coupled with a leader, and the leader sheets are arranged in stacked relation extending around the end of the support element opposite the withdrawal aperture to the opposite side of the support element, and from the container through the withdrawal aperture where each leader sheet may be grasped for drawing the photosensitive element, coupled therewith, from the stack of photosensitive elements around the end of the support element to the opposite side thereof. Improved means comprising the invention are provided for insuring that the photosensitive sheets are moved one at a time only, and that any photosensitive element other than the one being moved remains stationary in exposure position.

Figure 6:
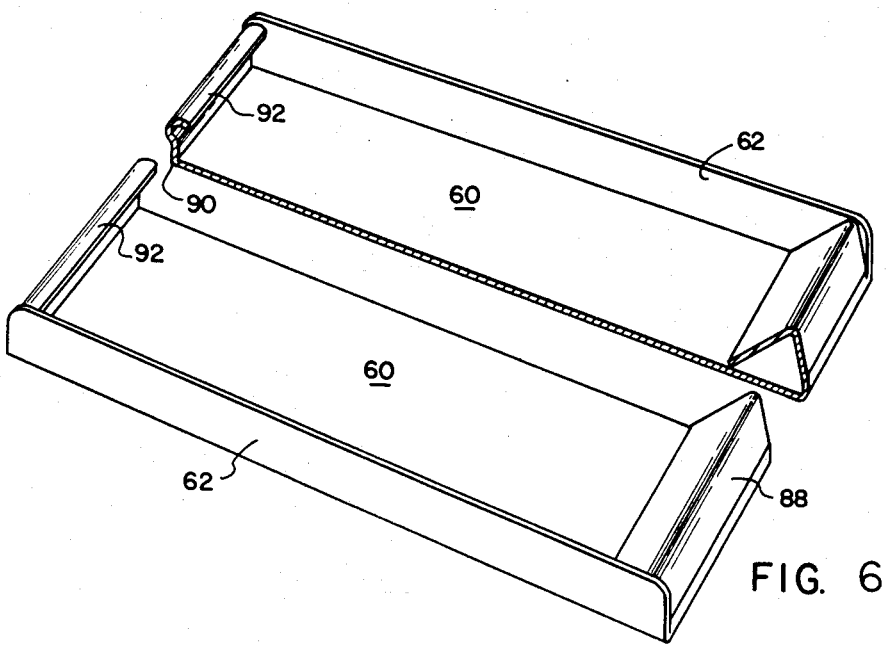
FIG. 6 is a fragmentary perspective view of a component of the film pack of FIG. 1.
Figure 1:
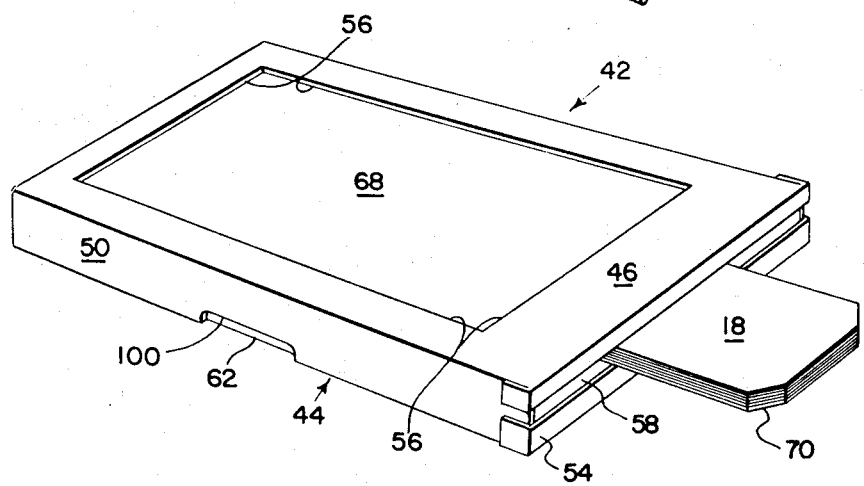
FIGURE 1 is a perspective view of a photographic product in the form of a film pack embodying the invention.
Figure 4:
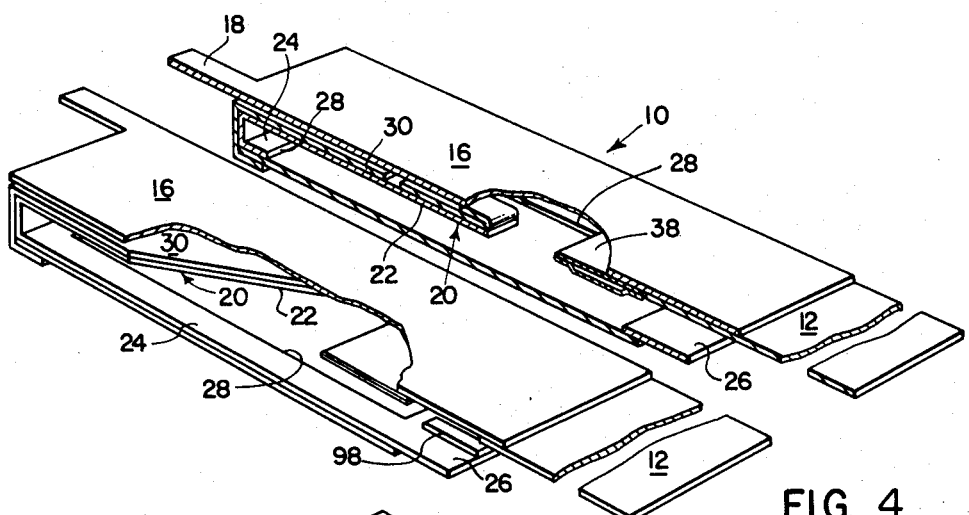
FIG. 4 is a fragmentary perspective view, partially in section, of a film unit adapted to be incorporated in the film pack of FIG. 1.
Figure 5:
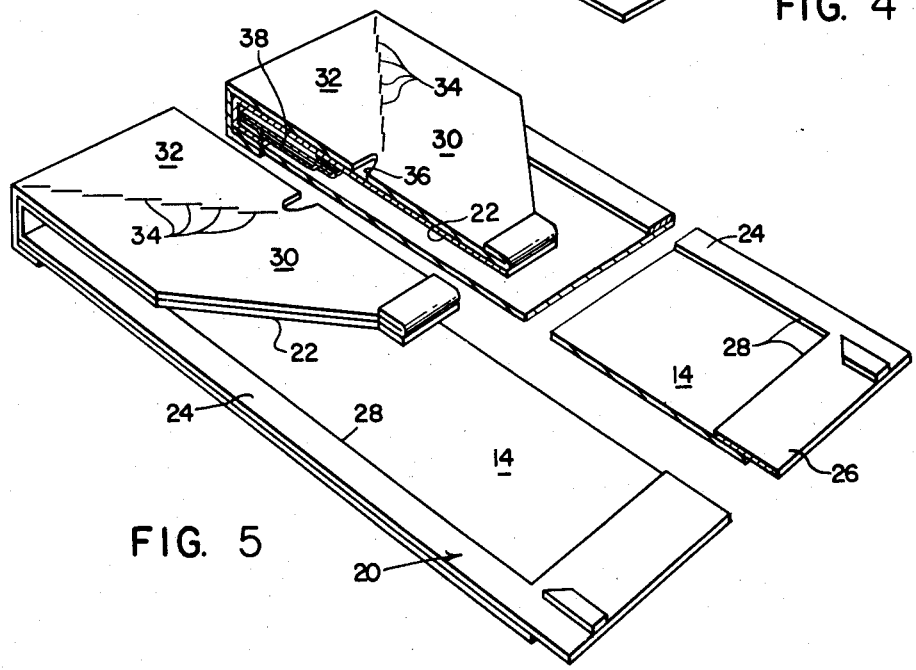
FIG. 5 is a view similar to FIG. 4 showing in detail a portion of the film unit of FIG. 4.

The invention is illustrated embodied in a film pack of the type comprising a plurality of film units each including a photosensitive element adapted to be exposed and a second element adapted to be superposed with the photosensitive element for aiding in the distribution of a processing fluid between the superposed elements. Reference is now made to FIGURES 1 through 3 of the drawings wherein there is illustrated a film pack 42 of this type. The film pack preferably comprises a plurality of film units 10 such as are shown in FIGURES 4 and 5. Each film unit 10 comprises a photosensitive sheet 12 and a second or image-receiving sheet 14. The photosensitive sheet is generally rectangular and comprises a layer of photosensitive material carried on a suitable support. The photosensitive material may comprise any of the materials usually employed in photography including, for example, the silver halides or other photosensitive heavy metal salts capable of having a developable latent image formed therein by exposure to actinic light, the ferric salts and the diazonium compounds. The support for the photosensitive layer may comprise any of the flexible sheet materials generally used for film base, including paper, plastics, mteallic foils and the like, and is preferably opaque to light actinic to the photosensitive material or includes a layer which is opaque to actinic light. Second sheet 14 is at least coextensive in area with the area or frame of the photosensitive sheet which is to be exposed and also comprises a flexible sheet material such as paper, plastic and the like. The second sheet in the form shown in substantially equal in width to, but slightly shorter than, the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion transfer reversal process such as described in U.S. Patents Nos. 2,543,181, issued February 27, 1951 and 2,662,822, issued December 15, 1953, both in the name of Edwin H. Land. The second sheet accordingly may comprise an image-receiving layer such as described in the above-mentioned patents carried on a flexible support sheet.

Photosensitive sheet 12 is mounted on a first carrier sheet 16 formed of a flexible sheet material such as paper, plastic, and the like, and preferably of a material such as glassine paper which has a highly calendered, smooth surface. First carrier sheet 16 may be adapted to perform a multiplicity of functions including providing a leader for connecting the photosensitive and second sheets, positioning the photosensitive sheets relative to one another, moving the film unit within a camera or other apparatus, withdrawing the film unit from the camera or apparatus, mounting a container of a fluid processing composition and, in one embodiment, collecting any excess processing fluid. In the form shown in FIGURES 2 and 4, carrier sheet 16 is substantially equal in width to photosensitive sheet 12 and is provided at one end, called its leading end, with a narrower leader portion 18. The opposite or trailing end of the carrier sheet is secured to the leading end of photosensitive sheet 12. This may be accomplished by adhering the photosensitive sheet directly to the carrier sheet by a suitable adhesive or by providing a narrow connecting member or strip. In an alternative embodiment of film unit 10, carrier sheet 16 may be of sufficient length so as to extend behind and beyond the trailing edge of the photosensitive sheet providing a trailing end portion for collecting excess processing fluid in a manner to be described hereinafter. In this last-mentioned embodiment, the photosensitive and image-receiving sheets may be substantially equal in length.

A second carrier sheet 20 is provided for mounting second or image-receiving sheet 14 and, like first carrier sheet 16, is adapted to perform a multiplicity of functions which include determining the area of the photosensitive and second sheets which are to be processed by a layer of the processing fluid spread between the sheets. Carrier sheet 20 comprises a tapered leading end section 22, an intermediate section 24 at least coextensive with second sheet 14 and a relatively short trailing end section 26. Second sheet 14 is mounted on intermediate section 24 with the image-receiving layer of sheet 14 disposed adjacent carrier sheet 20. Intermediate section 24 is provided with a generally rectangular aperture 28 defining the area of the image-receiving sheet in contact with which the fluid processing composition is spread and wherein a transfer image may be produced. The lateral margins of intermediate section 24 bordering the sides of aperture 28 cooperate in a manner to be described for confining the processing fluid between the sheets and for controlling the thickness of the layer of fluid spread between the sheets. Trailing end section 26 extends beyond the trailing edge of second sheet 14 and is adapted to cooperate with either the trailing end of the photosensitive sheet or, in the alternative embodiment, with the trailing end of first carrier sheet 16, for collecting excess processing fluid.

The end of tapered leading end section 22 is secured to first carrier sheet 16 intermediate the leading end of the first carrier sheet and the leading edge of photosensitive sheet 12 with the photosensitive layer of the photosensitive sheet and the image-receiving layer of the second sheet in face-to-face relation and with the leading edges of photosensitive and second sheets 12 and 14 substantially in alignment with one another. In the assembled form of the film unit shown, the trailing edge of second carrier sheet 20 should be disposed substantially in alignment with the trailing edge of photosensitive sheet 12. In the alternative embodiment wherein the photosensitive and second sheets are of substantially equal length and first carrier sheet 16 extends behind and beyond the trailing edge of the photosensitive sheet, the trailing edge of second carrier sheet 20 is in substantial alignment with the trailing edge of the first carrier sheet.

A tapered leader sheet 30, substantially coextensive with tapered leading end section 22 of carrier sheet 20, is provided secured at its trailing end to the leading edge of second sheet 14 at the surface thereof opposite carrier sheet 20, and at its leading edge to carrier sheet 16 at approximately the same location as is the leading edge of leading end section 22. Leader sheet 30 is provided with a tapered tear-out portion designated 32 and defined by a series of die cut lines 34 which extend from an aperture 36 in leader sheet 30 intermediate its ends and sides. Die cut lines 34 extend from aperture 36 outwardly toward the margins of leader sheet 30 where the latter is attached to second sheet 14. Tear-out section 32 provides means whereby, following processing of the photosensitive and image-receiving sheets, the image-receiving sheet may be separated from the photosensitive sheet and second carrier sheet 20. This is accomplished, for example, by inserting a fingernail into aperture 36 so as to grasp the narrowest portion of tear-out section 32 and tearing the latter along die cut lines 34 toward the leading edge of second sheet 14, and then employing the tear-out portion for peeling the second sheet away from carrier sheet 20 and photosensitive sheet 12. The bond between the tear-out portion of leader sheet 30 and the leading edge of the image-receiving sheet will, of course, be stronger than the bond between the image-receiving sheet and second carrier sheet 20 in order for stripping to occur.

The photosensitive and second sheets are adapted to be processed by a fluid composition carried in a rupturable container 38 mounted on either of carrier sheets 16 and 20 adjacent the leading edge of the photosensitive or second sheet which is secured to the particular carrier sheet. Container 38 is formed substantially as shown in the above-mentioned U.S. Patent No. 2,543,181 and comprises a rectangular blank of fluid- and vapor-impervious sheet material, folded longitudinally upon itself to provide two walls which are bonded together at their margins to form an elongated cavity for the processing fluid. The longitudinal seal is weaker than the shorter end seals and is adapted to become unsealed in response to hydraulic pressure generated within the fluid contents of the container by the application of compressive pressure to the container. Container 38, in the form shown in FIG. 1, is mounted on first carrier sheet 16 intermediate the leading edge of photosensitive sheet 12 and the point at which the second carrier sheet is secured to the first carrier sheet. The container extends substantially from side to side of the carrier sheet and the fluid cavity of the container is preferably at least as wide as aperture 28 in the intermediate section of the second carrier sheet. The longitudinal edge of the container which is adapted to become unsealed, is located facing the photosensitive sheet and closest the leading edge thereof. In an alternative form of film unit, container 38 is mounted on leading end section 22 of second carrier sheet 20 adjacent and leading edge of second sheet 14. Container 38, as shown in FIG. 2, is secured to carrier sheet 20 with the longitudinal edge of the container, which is adapted to become unsealed, located nearest the second sheet by a hinge strip 40 secured at the opposite longitudinal edge of the container.

Film unit 10, when assembled in position for exposure, is disposed with carrier sheet 16 folded adjacent the leading edge of photosensitive sheet 12 so that the photosensitive sheet faces away from the image-receiving sheet in the same direction as the latter. In this position of the film unit, first carrier sheet 16 extends between the photosensitive and image-receiving sheets toward the leading end of the image-receiving sheet and the trailing end of the photosensitive sheet. Leading end section 22 of second carrier sheet 20 is folded inwardly between the photosensitive and print-receiving sheets toward the trailing end of the image-receiving sheet and the leading end of the photosensitive sheet so that leading end section 22, leader sheet 30 and container 38 are disposed between the photosensitive and second sheets which are located to the outside of the film unit. Leader portion 18 of first carrier sheet 16 projects from between the leading end of the image-receiving sheet and the trailing end of the photosensitive sheet to provide means for manipulating the film unit so as to position the photosensitive and image-receiving sheets in superposed, aligned relation.

A plurality of film units 10 are assembled to form film pack 42, comprising means in the form of a generally parallelepiped shaped box or container 44 for enclosing the film units. Container 44 is adapted to fabrication from thin sheet material such as stiff paper, cardboard, sheet metal, plastic and the like, and comprises a rectangular forward wall 46 and a rear wall 48, joined by side walls 50, a trailing end wall 52 and a leading end wall 54. A rectangular exposure aperture 56 is provided in forward wall 46 for exposing the photosensitive sheets of film units positioned within container 44 and leading end wall 54 is provided with a slot 58 intermediate the forward and rear walls for withdrawing film units from the container.

Mounted within container 44 is a substantially flat and rigid pressure plate 60 having dependent flanges 62. Pressure plate 60 is so dimensioned and disposed within the container as to extend substantially from end to end thereof with flanges 62 located closely adjacent the side walls of the container and extending rearwardly so as to abut against rear wall 48.

Each film unit 10 of the film pack is disposed within container 44 with the photosensitive sheet of the film unit located forward of pressure plate 60 between the latter and forward wall 46. The first carrier sheet 16 of each film unit is bent around the trailing end of the pressure plate, and the second sheet 14, first carrier sheet 16, second carrier sheet 20 and container 38 are disposed behind the pressure plate between the latter and rear wall 48. Each of the plurality of film units 10 provided in box 44 is arranged in the same manner, with the photosensitive sheets disposed in one stack forward of the pressure plate and the second sheets disposed in another stack to the rear of the pressure plate. The photosensitive sheets in this position extend across aperture 56 in position to be exposed through the aperture and the second sheets are loosely contained to the rear of the pressure plate between flanges 62.

Means are provided for preventing light from entering aperture 56 and/or 58 and exposing the photosensitive sheets. In the form shown in FIGURES 4 and 5, this means comprises an envelope 64 secured around the stack of photosensitive sheets 12 within box 44. Envelope 64 is provided with an aperture 66 in its forward wall which is substantially coextensive with aperture 56 in forward wall 46 whereby the photosensitive sheets positioned within the envelope may be exposed. A pair of cover sheets 68 are provided located in superposed relation across aperture 56 and aperture 66 between forward wall 46 of box 44 and the forward wall of envelope 64. Envelope 64 and cover sheets 68 are formed of a light-opaque material, for example black paper, plastic and the like, and two cover sheets are provided in superposition in order to preclude any chance of exposure of the foremost photosensitive sheet due to minute holes in the cover sheets. Leader 70 is connected to the leading ends of the cover sheets at a location near the trailing end of the film pack and extends around the trailing end of the pressure plate between the second sheets and rear wall 48 of box 44 and thence through slot 58 at the leading end of the box. While there is little or no possibility of light entering slot 58, exposing the photosensitive sheets, this is positively precluded by the arrangement of envelope 64 and cover sheets 68 whose primary function is to cooperate with forward wall 46 to provide a lighttight baffle sealing exposure aperture 56 against the admission of light.

The film pack of the invention is adapted to be employed in a camera or other lighttight apparatus having an opening through which leaders 18, and the film units which said leaders comprise, may be withdrawn from the apparatus. When a film pack has been positioned in the apparatus, cover sheets 68 are withdrawn from the pack by drawing on leader 70 which projects through slot 58 in leading end wall 54. The cover sheets are thus drawn around the trailing end of pressure plate 60 behind the latter and from container 44, thereby leaving aperture 56 uncovered and permitting exposure of the photosensitive sheets. Following exposure of the foremost photosensitive sheet 12 located adjacent forward wall 46, the leader portion 18 and first carrier sheet 16 comprising the same film unit as the exposed photosensitive sheet, are drawn through slot 58 from container 44. As first carrier sheet 16 moves through slot 58, the photosensitive sheet 12 connected thereto is drawn around the trailing end of the pressure plate behind the pressure plate into superposed registered relation with the second sheet 14 comprising the film unit. In the form of film pack shown, as the photosensitive sheet is being moved into registration with the second sheet, container 38, mounted on first carrier sheet 16, is moved toward the leading end of the second sheet, and second carrier sheet 20 and leader sheet 30 are caused to roll progressively from the leading end thereof toward their trailing ends while the second sheet 14 remains substantially motionless within container 44.

Rolling of second carrier sheet 20 and leader sheet 30 should start along a transverse line at the leading ends of the sheets in the region of their attachment to first carrier sheet 16, necessitating that the second carrier sheet 20 and leader sheet 30 have a tendency to "break" or fold and roll more readily at this location. It is for this reason that the second carrier sheet and leader sheet are tapered so as to provide the least resistance to folding or breaking at their narrowest portions which occur at their point of attachment to the first carrier sheet.

While the foremost photosensitive sheet 12 is being drawn around the trailing end of the pressure plate into superposed and registered relation with the second sheet 14 comprising the same film unit, the second sheet and the remaining photosensitive sheets are required to be held substantially stationary with respect to the pressure plate and container 44. Accordingly, means are provided for holding the rearmost second sheet 14 substantially stationary with respect to container 44 while the photosensitive sheet 12, comprising the same film unit, is moved into superposition with the second sheet between the latter and rear wall 48 of the container. This last-mentioned means comprises a portion of pressure plate 60 at the leading edge thereof folded rearwardly and thence toward the pressure plate to provide a rearwardly projecting ramp 88 at the leading end of the pressure plate for displacing the leading end of the rearmost second sheet 14 to the rear of slot 58 so that the leading end of the second sheet is out of alignment with slot 58 and is engaged by leading end wall 54 for preventing movement of the second sheet during movement of first carrier sheet 16 and the foremost photosensitive sheet 12. When second carrier sheet 20 and leader sheet 30 have been completely unrolled and withdrawn through aperture 58, continued withdrawal of the second carrier sheet and leader sheet is effective to bend the leading end of the carrier sheet sufficiently to move the latter, in superposition with the photosensitive sheet comprising the same film unit, through slot 58 from container 44.

Means are provided on pressure plate 60 at the trailing end thereof for cooperating with the photosensitive sheets to prevent movement of the photosensitive sheets during withdrawal of the foremost photosensitive sheet from the film pack. This last-mentioned means comprises forming the trailing end portion of pressure plate 60 with a corner 90 having an abrupt edge located in alignment with the leading edges of photosensitive sheets 12. The trailing end portion of pressure plate 60 includes a dependent section 92 shaped so as to guide first carrier sheet 16 rearwardly and causing it to bend at the leading edge of the photosensitive sheet 12 to which it is attached. Dependent section 92 of pressure plate 60 is curved at its rearmost portion to facilitate movement of the photosensitive sheets around the trailing end of the pressure plate. The configuration of section 92 and corner 90 is such that tension on outermost carrier sheet 16 causes all the photosensitive sheets to be drawn against pressure plate 60 at corner 90, necessitating that the photosensitive sheets bend at this corner in order to move around the corner. The photosensitive sheets, because of their inherent stiffness, provide sufficient resistance to such bending to preclude any movement of the photosensitive sheets due to friction with the foremost photosensitive sheet as the latter is being moved. Because the foremost or outermost photosensitive sheet is not compressed against the pressure plate at corner 90 by an other photosensitive sheet or carrier sheet 16 and is more remote from corner 90, it does not have to bend as sharply, with the result that it can be easily bent sufficiently to allow it to move around the corner when drawn around the corner by first carrier sheet 16 attached to the foremost photosensitive sheet.

The resistance of the photosensitive sheet to bending may be increased adjacent corner 90 by the overlapping of the leading edge of the photosensitive sheet with the trailing edge of first carrier sheet 16 and the adherence of the two edge portions to one another by a relatively stiff adhesive. In this construction, the leading edge of photosensitive sheet 12 should be located approximately in alignment with corner 90 of the pressure plate so that the line of demarcation between the stiff and less stiff portions is located at the corner. To facilitate withdrawal of a photosensitive sheet around the end of the pressure plate in such a manner as to preclude the emulsion surface of the photosensitive sheet from scraping or rubbing against forward wall 46 of the container, flanges 62 on the pressure plate may be tapered slightly toward their ends. This construction will permit the pressure plate to rock slightly so that the trailing end of the pressure plate will move away from forward wall 46 during movement of a photosensitive sheet around the end of the forward wall.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a photographic film assemblage in which a plurality of photosensitive sheets are supported in position for exposure in stacked relation on one side of a support member, said photosensitive sheets are exposed in succession and, following exposure, each photosensitive sheet is drawn around an end section of said support member to the opposite side thereof, the combination in said film assemblage of a support member comprising an end section and a support section providing a substantially planar support surface having a substantially straight edge defined by a sharp corner formed by a first portion of said end section dependent from said support section at said edge; and a plurality of photographic film units each comprising a photosensitive sheet including a marginal portion having a substantially straight edge and a second sheet secured to said photosensitive sheet at said marginal portion, said photosensitive sheets being arranged in stacked relation and supported on said support surface with said edges of said photosensitive sheets in substantial alignment with said edge of said support surface, said end section including a second portion dependent from said first portion and curved toward the side of said support section opposite said support surface, said second sheets extending from said photosensitive sheets supported on said support surface around said second portion of said end section to said side of said member opposite said support surface, said second portion providing means for guiding the photosensitive sheet furtherest from said support surface around said end section of said support member from a position on said support surface to the opposite side of said support member, said sharp corner formed by said support section and said dependent first portion of said end section engaging at least another of said photosensitive sheets lying between the last-mentioned photosensitive sheet and said support surface and resisting the movement of said other photosensitive sheet during movement of said last-mentioned photosensitive sheet across said support surface toward and around said end section of said support member.

2. The photographic film assemblage of claim 1 wherein said photosensitive and second sheets of each of said film units cooperate to stiffen said film unit in the region of said marginal portion of said photosensitive sheet.

3. A photographic film assemblage comprising, in combination, a container having at least one substantially planar wall with an opening therein for transmitting light to the interior of said container for exposing the photosensitive sheets of film units positioned for exposure within said container; a support member comprising an end section and a support section providing a substantially planar support surface disposed adjacent the inner surface of said wall and having a substantially straight edge defined by a sharp corner formed by a first portion of said end section dependent from said support section at said edge; and a plurality of photographic film units each comprising a photosensitive sheet including a marginal portion having a substantially straight edge and a second sheet secured to said photosensitive sheet at said marginal position, said photosensitive sheets being arranged in stacked relation and supported on said support surface between the latter and said wall in alignment with said aperture in said wall, said edges of said photosensitive sheets being located in substantial alignment with said edge of said support surface, said end section including a second portion dependent from said first portion and curved toward the side of said support section opposite said support surface, said second sheets extending from said photosensitive sheets supported on said support surface around said second portion of said end section to said side of said member opposite said support surface, said second portion providing means for guiding said photosensitive sheet closest to said wall from between said wall and said support surface around said end section of said support member from a position intermediate said wall and said support surface to the opposite side of said support member from said wall, said sharp corner formed by said support section and said dependent first portion of said end section engaging at least another of said photosensitive sheets lying between the last-mentioned photosensitive sheet and said support surface and resisting the movement of said other photosensitive sheet during movement of said last-mentioned photosensitive sheet across said support surface between said support surface and said wall toward said end section and around said end section.

4. The photographic film assemblage of claim 3 wherein said photosensitive and second sheets of each of said film units cooperate to stiffen said film unit in the region of said marginal portion of said photosensitive sheet.

5. A photographic film assemblage comprising, in combination, a container having forward and rear walls and an opening at one end intermediate said forward and rear walls, said forward wall being substantially planar and including an exposure aperture through which light can be transmitted for exposing photosensitive sheet materials positioned within said container; a substantially inflexible support member comprising an end section and a support section providing a substantially planar support surface disposed between said forward and rear walls in face-to-face relation with the inner surface of said forward wall, said support surface having a substantially straight edge defined by a sharp corner formed by a first portion of said end section dependent from said support section at said edge and extending toward said rear wall, said end section of said support member being located at the end of said container opposite said opening; and a plurality of photographic film units each comprising a photosensitive sheet including a marginal portion having a substantially straight edge and a second sheet secured to said photosensitive sheet at said marginal portions, said photosensitive sheets being arranged in stacked relation and supported on said support surface between the latter and said forward wall in position for exposure in alignment with said exposure aperture, said photosensitive sheets being disposed with said edges thereof in substantial alignment with said edge of said support surface, said end section including a second portion dependent from said first portion and curved toward said one end of said container and the side of said support section opposite said support surface, said second sheets extending from said photosensitive sheets supported on said support surface around said second portion of said end section intermediate said support member and said rear wall, and through said opening where said second sheets can be engaged for withdrawing the film units of which they are a part from said container, said second portion providing means for guiding the photosensitive sheet closest to said forward wall from between said support surface and said forward wall around said end section of said support member to a position intermediate said support member and said rear wall, said sharp corner formed by said support section and said dependent first portion of said end section engaging at least another of said photosensitive sheets lying between the last-mentioned photosensitive sheet and said support surface and resisting the movement of said other photosensitive sheet during movement of said last-mentioned photosensitive sheet across said support surface between the latter and said forward wall and around said end section of said support member.

References Cited in the file of this patent

UNITED STATES PATENTS

| | | |
|---|---|---|
| 2,495,113 | Gannon | Jan. 17, 1950 |
| 2,612,451 | Land | Sept. 30, 1952 |